United States Patent
Kulkarni et al.

(10) Patent No.: US 11,340,767 B2
(45) Date of Patent: *May 24, 2022

(54) SMART EMAIL TASK REMINDERS

(71) Applicant: VMware, Inc., Palo Alto, CA (US)

(72) Inventors: Mayank Kulkarni, Gainesville, FL (US); Adam Chow, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,833

(22) Filed: Jun. 10, 2021

(65) Prior Publication Data

US 2021/0294486 A1    Sep. 23, 2021

Related U.S. Application Data

(63) Continuation of application No. 16/740,922, filed on Jan. 13, 2020, now Pat. No. 11,048,392, which is a continuation of application No. 15/690,461, filed on Aug. 30, 2017, now Pat. No. 10,534,520.

(51) Int. Cl.
| | |
|---|---|
| *G06F 3/04842* | (2022.01) |
| *H04L 51/42* | (2022.01) |
| *G06Q 10/10* | (2012.01) |

(52) U.S. Cl.
CPC ....... *G06F 3/04842* (2013.01); *G06Q 10/107* (2013.01); *H04L 51/22* (2013.01); *G06Q 10/10* (2013.01)

(58) Field of Classification Search
CPC .............................. G06F 3/04842; H04L 51/22
See application file for complete search history.

(56) References Cited

U.S. PATENT DOCUMENTS

| | | |
|---|---|---|
| 7,571,108 B1 | 8/2009 | Leban |
| 8,793,575 B1 | 7/2014 | Lattyak |
| 10,218,670 B2 | 2/2019 | Umapathy |
| 2003/0041112 A1 | 2/2003 | Tada |
| 2003/0097361 A1 | 5/2003 | Huang |
| 2003/0144831 A1 | 7/2003 | Ford |
| 2005/0192992 A1 | 9/2005 | Reed |
| 2011/0145822 A1 | 6/2011 | Rowe |
| 2012/0054135 A1 | 3/2012 | Salaka |
| 2012/0246243 A1 | 9/2012 | Nagamine |
| 2014/0019567 A1 | 1/2014 | Chen |
| 2015/0205782 A1 | 7/2015 | Subramanya |
| 2015/0286383 A1 | 10/2015 | D'Aloisio |
| 2016/0086116 A1 | 3/2016 | Rao |
| 2017/0364866 A1 | 12/2017 | Steplyk |
| 2018/0091459 A1 | 3/2018 | Bastide |
| 2018/0130075 A1 | 5/2018 | Roy |
| 2018/0152407 A1 | 5/2018 | Soni |
| 2018/0314695 A1 | 11/2018 | Prouzet |

*Primary Examiner* — Eric J. Bycer
(74) *Attorney, Agent, or Firm* — Clayton, McKay & Bailey, PC

(57) ABSTRACT

Systems and methods herein assist users by identifying actionable tasks in an email and providing reminders and other tracking mechanisms for those tasks. For example, a method can include extracting a portion of the email and assigning a number to each word of the extracted portion of the email according to a library. The method can further include determining, based on the assigned numbers, whether the extracted portion of the email includes at least one actionable portion. In response to determining that the extracted portion of the email includes at least one actionable portion, at least one actionable portion can be presented to the user on a GUI associated with the user's device.

20 Claims, 7 Drawing Sheets

SMART EMAIL TASK REMINDERS

This application is a continuation of, and claims priority to, U.S. patent application Ser. No. 16/740,922, now U.S. Pat. No. 11,048,392, filed Jan. 13, 2020, which is a continuation of, and claims priority to, U.S. patent application Ser. No. 15/690,461, now U.S. Pat. No. 10,534,520 filed Aug. 30, 2017, both of which are expressly incorporated herein in their entireties.

BACKGROUND

Despite the increasing options for digital communication, such as instant messaging and social media, email communication remains the leading form of business communication. Worldwide, over 200 billion emails are sent on an average day. Many of these emails include requests for the email recipient to carry out a particular task. The process of identifying actionable requests and tracking them to completion is still a manual task that takes time and is prone to errors, lowering the recipient's overall efficiency When a user receives an email, they must first decide whether to read the email, and after reading the entire email, determine whether any portion of the email requires a response or other action. The user can then either provide the response or action immediately or plan to provide it at a later time. In the latter case, the user must either rely on their memory to remember to complete the task, or manually track the task by, for example, writing it down, inputting it into a calendar, or flagging the email. But even then, the user will need to revisit their mechanism for manually tracking the task in order to remind themselves of what remains to be done, by searching through emails or locating to-do lists, for example. Additionally, the user must manually cease tracking tasks as they are completed. The result of these systems is that users are slower to complete some tasks and can easily forget to complete other tasks.

For at least these reasons, a need exists for systems and methods that assist an email recipient in identifying actionable requests in emails as they are received and tracking those requests efficiently. More specifically, a need exists for systems and methods that can present actionable portions of emails on a graphical user interface ("GUI") for a user in a manner that increases the user's efficiency and provides the user with easily shortcuts for tracking, organizing, and managing actionable requests that are still pending.

SUMMARY

It is to be understood that both the foregoing general description and the following detailed description are exemplary and explanatory only and are not restrictive of the examples, as claimed.

Systems and methods herein assist users by identifying actionable tasks in an email and providing reminders and other tracking mechanisms for those tasks. An example method can include extracting a portion of a received email, such as the body of an email. The method can include assigning a number to each word of the extracted portion of the email based on a library correlating words to particular numbers. The method can include determining, based on the assigned numbers, whether the extracted portion of the email includes at least one actionable portion. An actionable portion of the email, also referred to as an "action item," "actionable item," or "actionable task" can be anything that requests or implies the need for the email recipient to take some sort of action. Examples include requests such as "please provide the following information," "please let me know ASAP," "can you take a look at this attachment," and "let me know what you think."

The method can also include, in response to determining that the extracted portion of the email includes at least one actionable item, presenting the actionable item on a GUI of a device associated with the email recipient. For example, the email application can present the actionable item on the display of a user device. The actionable item can be displayed in a number of ways that assist the user in managing actionable items, associating actionable items with other events, and motivating the user to complete outstanding actionable items.

The method can include highlighting the actionable item within the email text such that the user can readily identify the actionable item and distinguish it from the rest of the email. Highlighting can include any mechanism for visually drawing attention to the actionable item, such as underlining, circling, coloring, or obscuring the non-actionable portions of the email.

The method can also include displaying the actionable item, or items, from an email in a hero card associated with the email. The hero card can be a card, window, page, box, or other item displaying information and presented on the GUI. The hero card can be presented along with the associated email, such as directly above or below the email, and can include any actionable items extracted from the email. In one example, the email client can reserve a space for display of hero cards. The hero card can include a checklist of detected actionable items, including response status. In one example, the checklist is limited to detected actionable items associated with a particular sender. The sender can be selected by the user or determined by the email client based on a recipient of an email being drafted by the user or based on a sender of an email being viewed by the user. In one example, each outstanding actionable item can be individually represented in its own hero cards. The user can cycle through the multiple hero cards in an example.

The method can further include displaying one or more actionable items in a meeting invitation, calendar entry, or a reminder for either. For example, if the user has a meeting scheduled with Adam, the method can include displaying a meeting invitation and inserting an actionable item retrieved from an email sent by Adam to the user, such as a request to "talk about the expense account at the meeting." The user can therefore get a reminder on the substance of the meeting or other outstanding requests from any meeting participants.

The method can include presenting a graphical representation of actionable items completed by the user within a period of time relative to the overall number of actionable items presented to the user within that same timeframe. For example, the method can include displaying a graphic representing the percentage of actionable items received in the past 7 days that have been completed. In another example, the method can include a "burndown chart" projecting expected progress on resolving actionable items and tracking the user's actual progress comparing the two in a graphical format. These various charts and representations can be presented in a hero card in one example.

In another example, a non-transitory, computer-readable medium is provided. The computer-readable medium includes instructions that, when executed by a processor of a computing device, cause the processor to perform stages for identifying actionable tasks in a received email. This can include, for example, extracting a portion of the email and assigning a number to each word of the extracted portion of the email. The stages can further include determining, based on the assigned numbers, whether the extracted portion of the email includes at least one actionable portion, and in response to determining that the extracted portion of the email includes at least one actionable portion, presenting the at least one actionable portion on a GUI.

In yet another example, a system is provided for identifying actionable tasks in a received email. The system can include a user device comprising a processor, a display, and an email application such as BOXER. The processor of the user device can perform stages including, for example, extracting a portion of the email and assigning a number to each word of the extracted portion of the email. The stages performed by the processor can further include determining, based on the assigned numbers, whether the extracted portion of the email includes at least one actionable portion, and in response to determining that the extracted portion of the email includes at least one actionable portion, presenting the at least one actionable portion on a GUI.

BRIEF DESCRIPTION OF THE DRAWINGS

FIG. 2A is an exemplary illustration of an example GUI of an email application on a user device.
FIG. 2B is an exemplary illustration of an example GUI of an email application on a user device.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods herein assist users by identifying actionable tasks in an email and providing reminders and other tracking mechanisms for those tasks. For example, a method can include extracting a portion of the email and assigning a number to each word of the extracted portion of the email according to a library. The method can further include determining, based on the assigned numbers, whether the extracted portion of the email includes at least one actionable portion. In response to determining that the extracted portion of the email includes at least one actionable portion, at least one actionable portion can be presented to the user on a GUI associated with the user's device.

Figure 1:
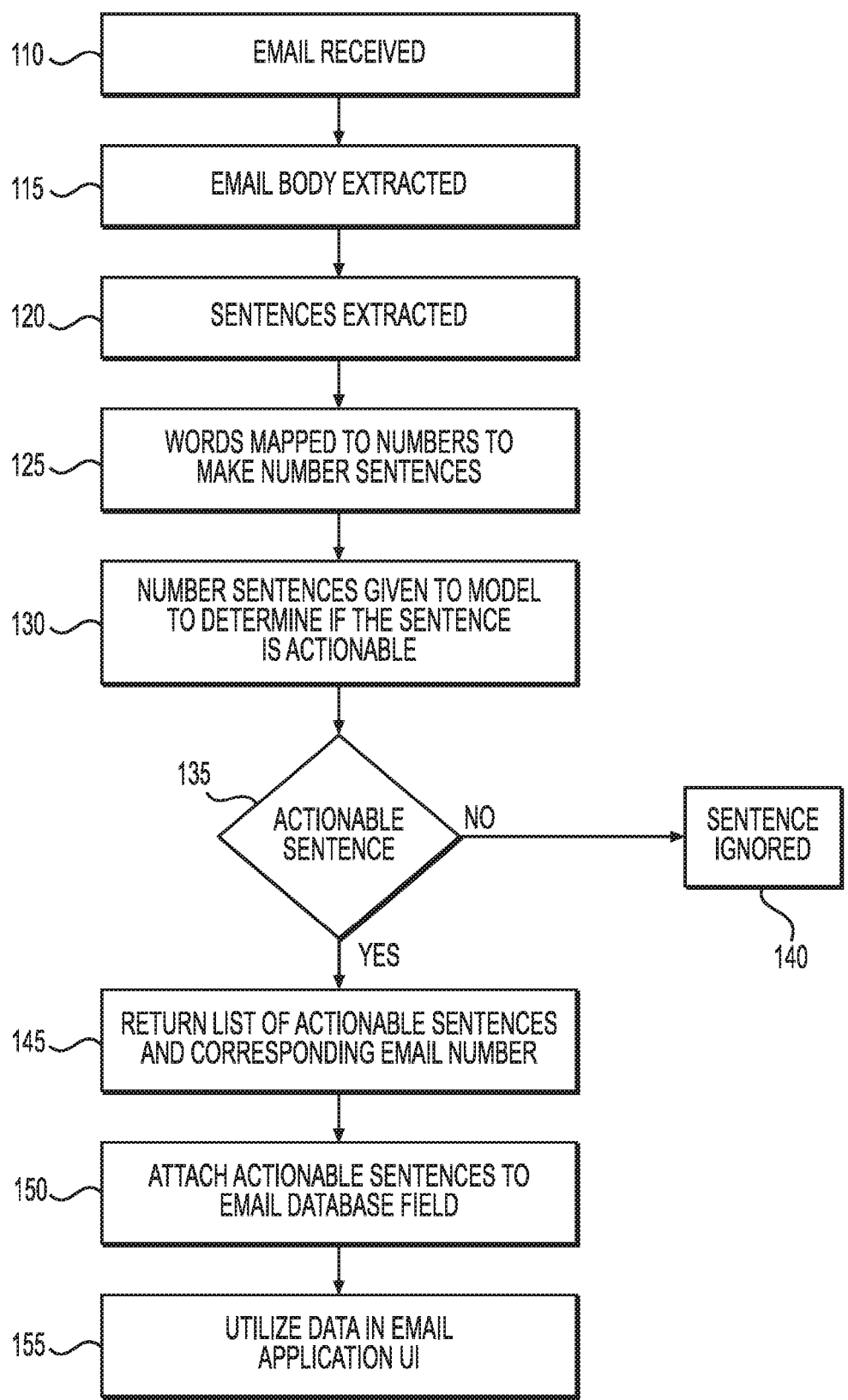
FIG. 1 is an exemplary flowchart of an example method for identifying actionable tasks in a received email.

FIG. 1 provides a flowchart of an example method for identifying actionable tasks in a received email. At stage 110, an email is received at a user device. The user device can be any computing device, such as a smartphone, laptop, tablet, personal computer, or workstation. A user device can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The user device can execute one or more email applications. These applications can be standard email applications installed as part of an operating system, such as APPLE's iOS MAIL application or MICROSOFT OUTLOOK. The applications can also be aftermarket email solutions, such as VMWARE's BOXER. The email applications can be stand-alone, unmanaged applications, or they can be managed by a management server that enrolls the user device. The management server can provide rules, limits, and other configurations for any managed email application.

The stages of FIG. 1 can be carried out regardless of whether the user utilizes a managed or unmanaged email application, or whether the user is accessing an enterprise email account or a personal email account.

At stage 115 of the method, the email body is extracted by the email application. The email body can be considered any media included in the email, including text, pictures, and signatures. The email body can exclude the subject line and the "To," "From," "CC," and "BCC" fields. Extracting the email body can include, for example, identifying the body of the email, extracting all elements within the body, and copying those elements over to another file or format. This stage can also include performing optical character recognition if necessary.

At stage 120, sentences are extracted from the extracted email body. This stage can include parsing the email body to distinguish sentences, including partial sentences such as standalone clauses or phrases, from other portions of the email body. For example, at this stage images, greetings, and signatures can be removed or ignored. Legal notices included in signatures or appended to the email body can also be removed or ignored. The remaining email body can be separated into distinct sentences.

Stage 125 can include mapping the words of each extracted sentence to numbers, according to an index. The index can be a table saved on the user device, for example, and can provide a unique numerical value for every word or root word. In some examples, different words can map to the same number. For example, the words "receive" and "recieve" [sic] can map to the same number, as they are both variations intended to convey the same word. The same process can apply to words with the same root but different prefixes, suffixes, or word endings. For example, the words "provide," "provided," and "providing" can be mapped to the same number. When a word is not included in the index, it can be automatically added to the index and assigned a new, unique numerical value.

The result of words being mapped to numbers, but kept in the same relative positions, is number sentences. A number sentence version of "hello, how are you?" can be, for example, "8353, 4372 2033 3054?" In another example, binary numbers can be used, such as "101101, 011001 101110 001001?"

These number sentences can be provided to a model at stage 130, to determine whether each sentence is actionable or not. The model can be a result of a machine-learning process carried out apart from the user device, such as at a central server or other computing device. In some examples, the machine-learning process can be conducted by a secure email gateway ("SEG") positioned between the user device and an outgoing email server. The model can utilize one or more machine-learning techniques, such as Random Forest Classifiers ("RFC"), Recurrent Neural Networks with Long Short Term Memory ("LSTM"), and Convolutional Neural Networks ("CNN").

The model can be initially trained with any large dataset of emails. For example, the model can be trained using the "Enron Corpus," a large database of over 600,000 emails generated by employees of the Enron Corporation and acquired by the Federal Energy Regulatory Commission during its investigation. The Enron Corpus is a publicly available mass collection of real emails readily available for study. Other email datasets may be used, however. An enterprise with unusual and specific terminology might wish to use a dataset of internal emails. Similarly, an enterprise that uses a non-English language can use a dataset that includes emails of the same language. By converting words into number sentences, model training can be performed across datasets of multiple languages. The dataset can also include labels for sentences, indicating whether a sentence is considered "actionable" or not.

An RFC model can be trained using the bag-of-words technique, which is a simplifying representation wherein text is represented as a "bag," or multiset, of its words, disregarding grammar and word order but keeping multiplicity. This technique can be used on unigrams and bigrams for the input sentences, along with 100 tree instances, in one example.

An LSTM model can be trained using "Dense Word Vectors" that represent words as vectors with dimensions corresponding to the words, and whose values can be a function of the count of the word co-occurring with each neighboring word. The model can be trained using 150 dimensions, in one example, that are randomly initialized and updated during the training. The model can also use 150 hidden units with "tanh" activation and a non-recurrent dropout layer with a drop probability of 0.2. The model can use binary-cross entropy as the cost function, optimized using Adaptive Moment Estimation.

A CNN model can be trained using Dense Word Vectors of 150 dimensions that are randomly initialized and updated during the training. The training can include three layers and filter size of 128 with 1, 2, and 3 filters in the layers. It can also include a dropout layer with a drop probability of 0.2, fed into a vanilla neural network with 200 neurons in its hidden layer. It can include "tanh" activation and a "sigmoid" activated single output layer neuron. The model can use binary-cross entropy as the cost function, optimized using Adaptive Moment Estimation.

Regardless of how the model is trained, it can be improved over time as more emails are processed and feedback is received. In some examples, the email application can present an option for the user to provide feedback on the results of the model, such as by confirming whether the model was correct or incorrect at determining whether a sentence was actionable. This feedback can be transmitted from the user device to a server with the processing power to run simulations and training for machine-learning models. When the model is altered or otherwise updated, the server can send a new version of the model to the user device to be incorporated in the email application. In some examples, the new model can be provided to the user device by way of an application update. In other examples, a management server can provide the new model to the user device and instruct a management agent (installed on the user device as part of enrolling the user device with the management server) to update the relevant email application accordingly.

The determination of whether a sentence (including standalone phrases or clauses) is actionable can occur at stage 135. The purpose of this determination is to determine whether a particular sentence would cause the user to need to take some type of action. Example actions include, without limitation, responding to an email, making a phone call, confirming receipt of an email, document, or other item, providing a document or other file, or performing any other work-related or personal task. The outcome of the determination at stage 135 is based on the model to which the number sentences are provided at stage 130.

If a sentence is determined at stage 135 to NOT be actionable, then the method proceeds to stage 140 and that sentence is ignored. If, however, the sentence is determined to be actionable, then at stage 145 that sentence is marked as actionable and returned along with a list of any other actionable sentences in the email. The actionable sentences are also identified as belonging to a particular email. The number sentences can be converted back to words before being returned.

At stage 150, the actionable sentences are attached to an email database field. The email database field can be used to store information about the email, including information identifying any actionable sentences (also referred to as "action items," "actionable items," or "actionable tasks") within the email. At stage 155, that information can be utilized by the email application. The email application can present information regarding actionable items to the user in a multitude of ways, as discussed further with respect to FIGS. 2A-5.

Figure 2A:
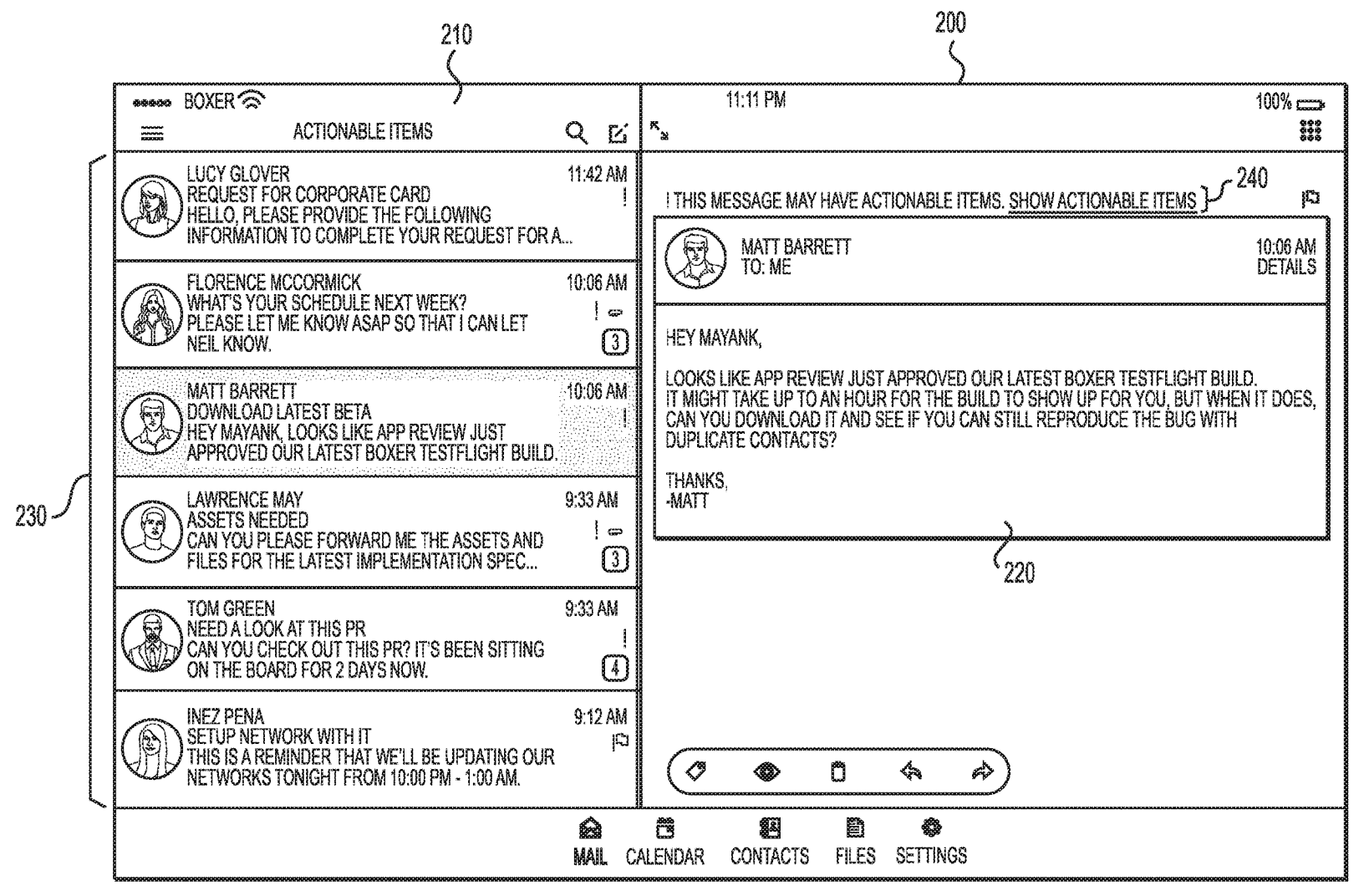

FIG. 2A depicts an example GUI 200 that can be displayed on a user device by an email application as described above. The GUI 200 includes an Actionable Items view 210 that displays a list of all emails 230 including unresolved actionable items. The emails 230 in the Actionable Items view 210 can include exclamation points or other identifiers indicating that the email includes one or more actionable items. The emails 230 in the Actionable Items view 210 can also include numbers indicating that a particular email 230 contains multiple actionable items, rather than just one.

Selecting an email 230 from the list 210 can display the email 230 include the email body 220. In some examples, and as shown in FIG. 2A, the GUI can display the Actionable Items view 210 and the email body 220 simultaneously. This can be useful when the user device is large, such as an APPLE IPAD, or when the user device is a phone that is being operated in landscape configuration. When a phone is being used in portrait configuration, selecting an email 230 can cause the GUI to display the email 220 but not the Actionable Items view 210.

The GUI can include an indication 240 that the selected email 230 includes one or more actionable items. The indication 240 can include a button, hyperlink, or other selectable GUI element that a user can select to show actionable items. The actionable item can be shown without providing the user with an option. In some examples, the email application can provide an option—either as a slider or button shown on the GUI 200 or as a selection within the Settings of the email application—to turn "on" or "off" the automatic display of actionable items. This option can even be customized such that emails from a particular email account, such as an enterprise account, automatically display actionable items, while emails from a different account, such as a personal account, do not automatically display actionable items.

Figure 2B:
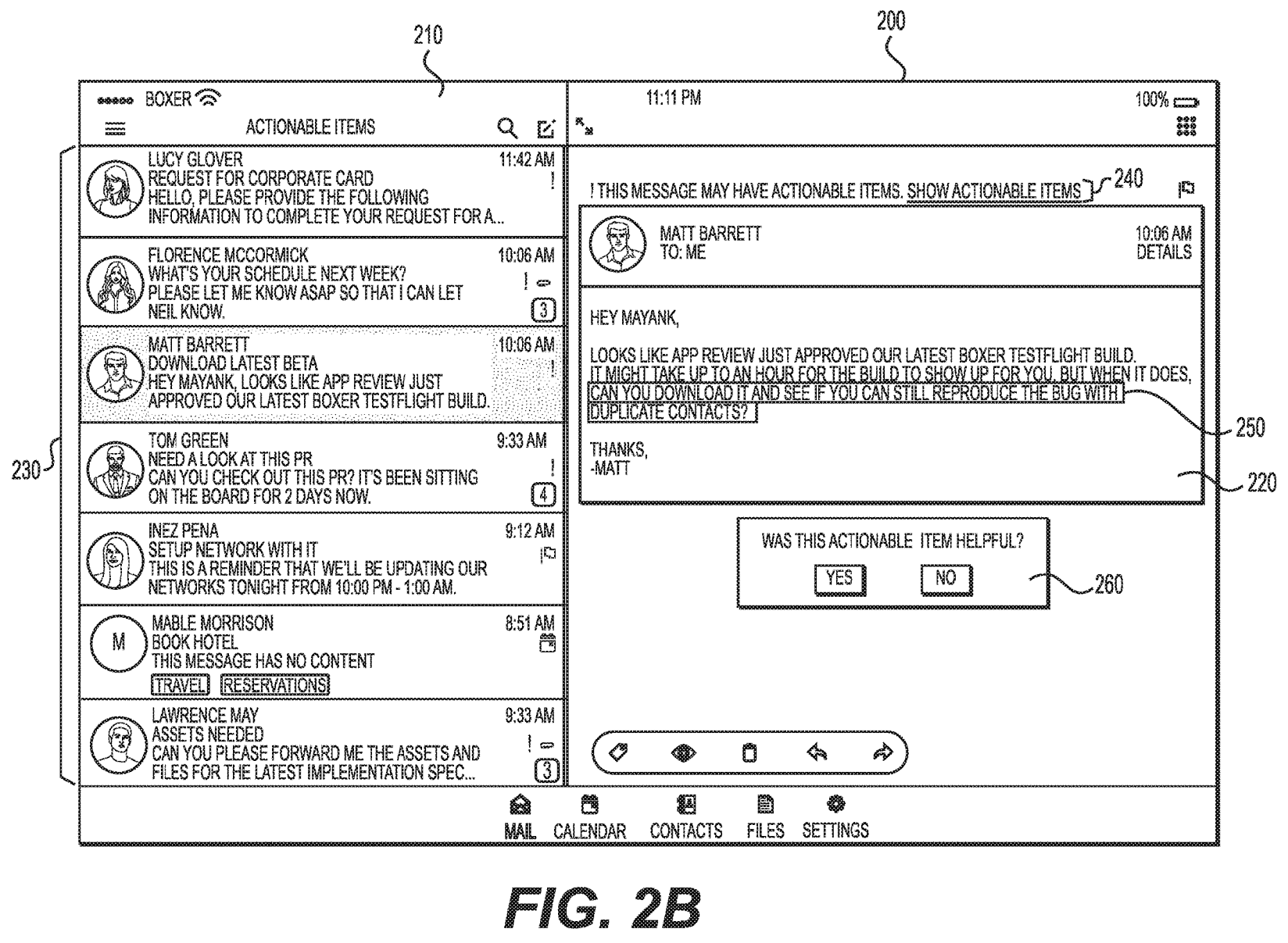

FIG. 2B shows the example GUI 200 of FIG. 2A after a user has selected the option 240 to "show actionable items." As a result of that selection, the GUI 200 includes a highlight element 250 that highlights the relevant actionable item or items. In this example, one actionable item is selected: "can you download it and see if you can still reproduce the bug with duplicate contacts?" As mentioned earlier and as shown in FIG. 2B, the actionable item need not be a complete sentence. Instead, it can be, an actionable portion of a sentence.

Although the highlight element 250 shown in FIG. 2B is depicted as a box around the actionable item, any type of highlight element 250 can be used. For example, the text of the actionable item can be underlined, bolded, or italicized. The text of the actionable item can also be displayed in a different color or with a colored "highlight" background. In another example, the entire GUI can be visually obscured, either partially or totally, except for the actionable item itself. For example, the GUI (aside from the actionable item) can be grayed out by applying a transparent layer of gray to it. Regardless of the manner in which the actionable item is highlighted, the highlight element 250 can visually bring the user's attention to the actionable item.

The GUI 200 can optionally display a feedback element 260 that prompts the user to provide feedback regarding the actionable item(s) shown in the email body 220. The feedback element can ask the user whether the actionable item was helpful or otherwise accurately determined to be actionable, and can provide the user with one or more selectable elements to be used in communicating the feedback. In the example of FIG. 2B, the feedback element 260 asks the user "Was this actionable item helpful?" and provides two selectable elements in the form of buttons corresponding to "yes" and "no," respectively. The feedback element 260 can be configured such that upon the user selecting "no," the feedback element 260 presents an additional text field that requests the user to explain why the actionable item was not helpful or accurate. The data obtained through the feedback element 260 can be stored on the user device and transmitted to a server. The server can utilize the feedback to refine the machine-learning model and ultimately provide a more accurate model to the user device in the future.

Figure 3:
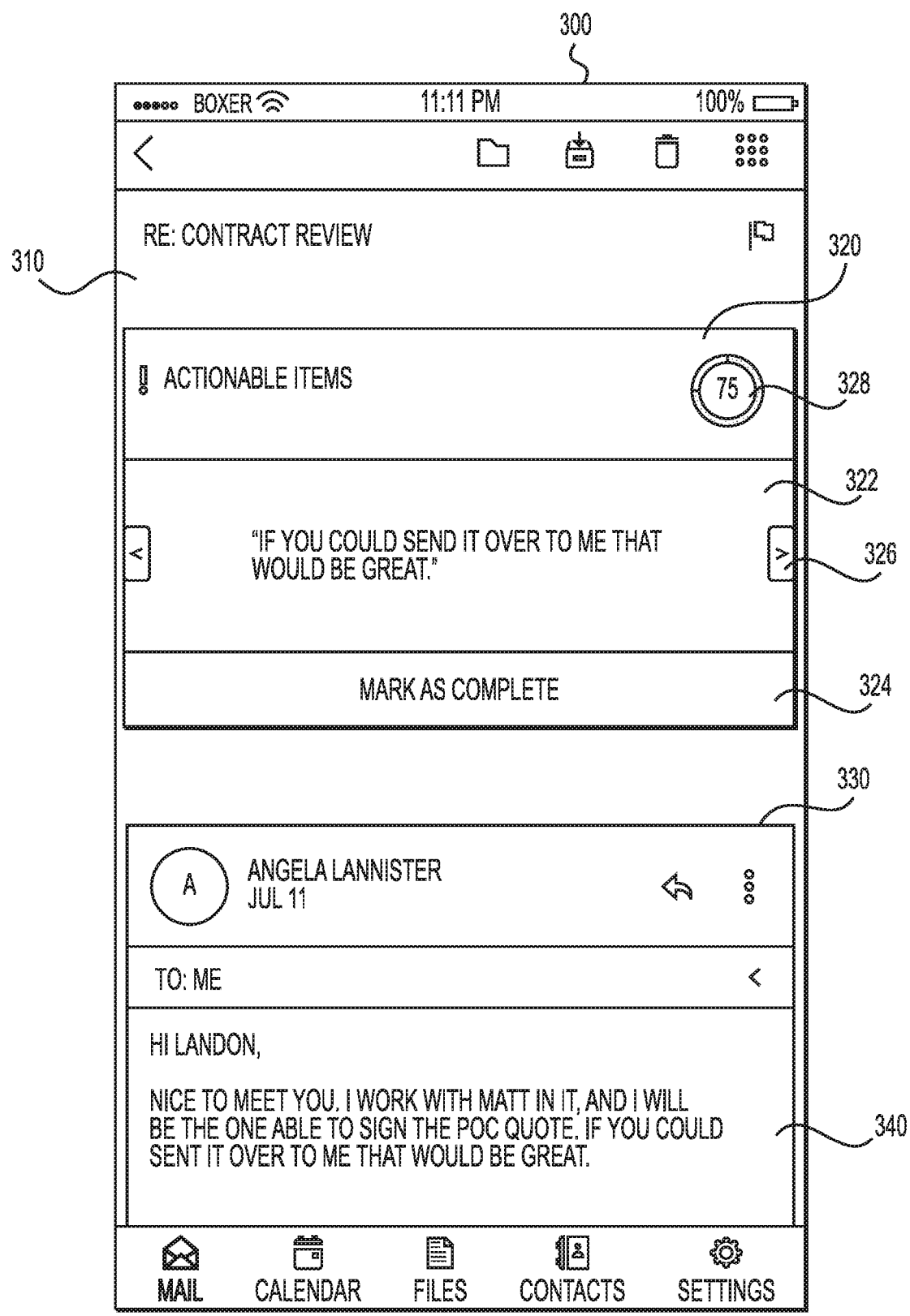
FIG. 3 is an exemplary illustration of an example GUI of an email application on a user device.

FIG. 3 provides an illustration of an example GUI 300 that can be displayed on a user device by an email application installed on the device. In the example of FIG. 3, an email page 310 is displayed as a result of the user selecting an email. The email can be selected from the inbox or from an Actionable Items view 210 such as the one shown in FIGS. 2A and 2B. The email page 310 includes a hero card 320 and an email card 330. The hero card 320 is displayed above the email card 330 in this example, but the cards 320, 330 can be presented in any order or side by side, depending on the orientation of the display.

The email card 330 displays information regarding the email, including the sender, the date of sending, the recipient, and the email body 340. The hero card 320 can display an actionable item 322 extracted from the email using a method as described in conjunction with FIG. 1. If the email contains multiple actionable items 322, all of the actionable items 322 can be displayed on the hero card 320 in one example. In another example, arrow buttons 326 can be presented when multiple actionable items 322 are present, allowing a user to scroll between the multiple actionable items 322. In other examples, the arrow buttons 326 function to scroll between actionable items 322 corresponding to different emails. In those examples, the arrow buttons 326 would also cause a different email card 330 to be displayed based on the actionable item 322 being shown at the time.

The hero card 320 can include a button 324 that allows the user to "mark as complete" a relevant actionable item 322. Selecting that button 324 will remove the hero card 320 and remove the email from views showing emails with actionable items 322, such as the Action Item view 210 of FIGS. 2A and 2B. Where multiple actionable items 322 are displayed on one hero card 320, each actionable item 322 can be followed by a "mark as complete" button 324 such that the user can mark particular actionable items 322 complete but leave others that have not yet been completed. In another example, multiple actionable items 322 can be displayed in one hero card 320 in form of a checklist. The user can select or deselect each individual actionable item 322 on the checklist to indicate whether the item 322 has been completed.

The hero card 320 can also include a progress icon 328 providing information to the user regarding their overall handling of actionable items 322. The progress icon 328 can display a statistical or graphical (or both) indication of the user's progress through actionable items 322 that have been received within a particular period of time. For example, the progress icon 328 can reflect the percentage of actionable items 322 resolved in the past seven days relative to the number of actionable items 322 received in that same seven-day period. In the example of FIG. 3, the progress icon 328 provides both a numerical representation of the percentage of complete actionable items 322 (in this example, 75%), as well as a graphical representation of that percentage. The progress icon 328 is discussed more with respect to FIG. 5, below.

Figure 4:
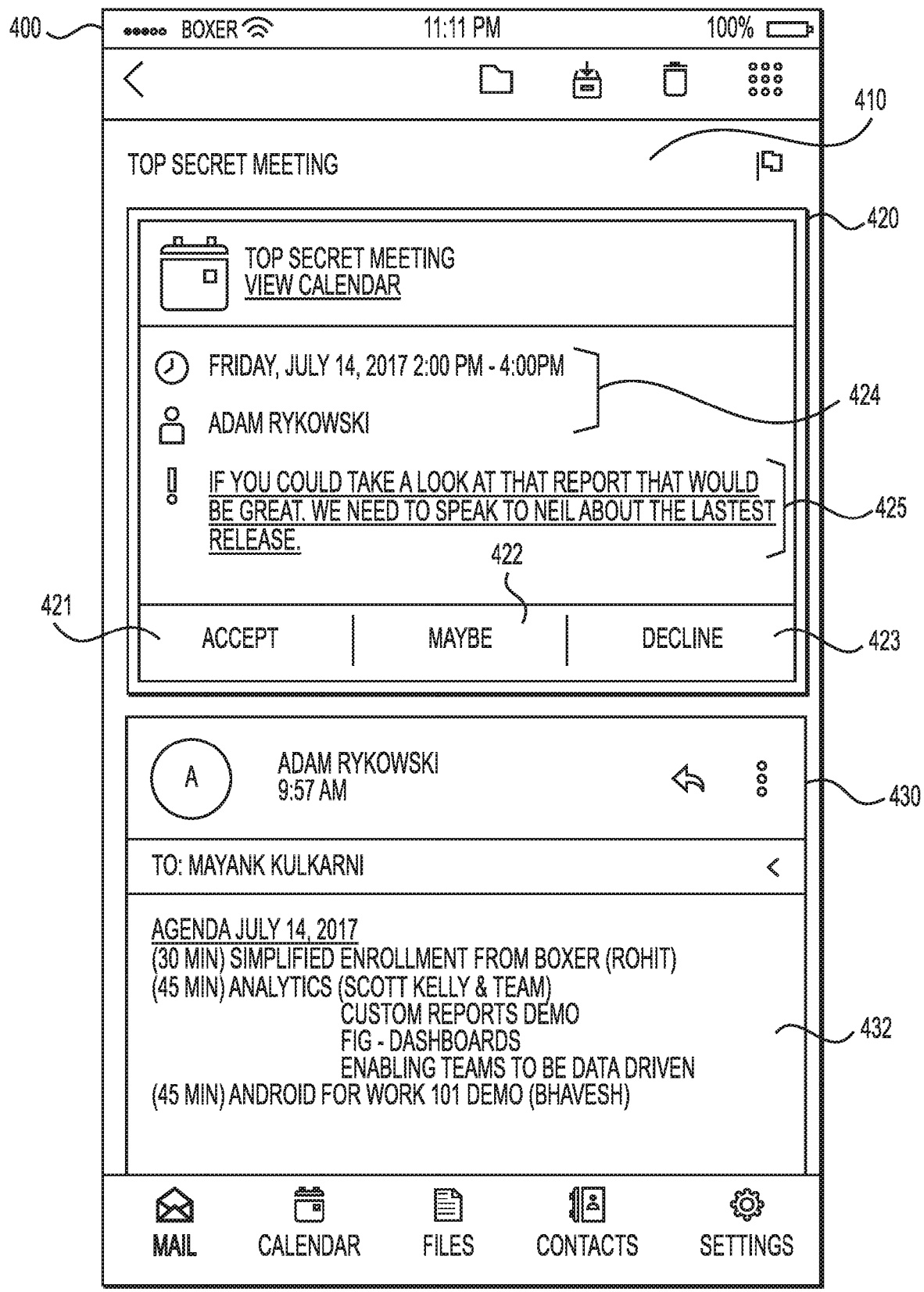
FIG. 4 is an exemplary illustration of an example GUI of an email application on a user device.

Although the previous examples relate to displaying actionable items within, or in association with, emails that are being displayed, in some examples the actionable items can be displayed in other contexts as well. FIG. 4 provides such an example in the context of a meeting invitation. The GUI 400 depicted in FIG. 4 includes a meeting invite page 410 that includes a meeting card 420 and a meeting invitation 430. The meeting invitation 430 includes a meeting-invitation body 432 in which the sender of the meeting invitation 430 can include additional text for the intended recipients to review. In this example, the meeting-invitation body 432 includes an agenda for the meeting, but it can include any other information such as a dial-in number and passcode. The meeting card 420 can be a type of hero card.

The meeting card 420 displayed within the meeting invite page 410 provides a summary of the meeting invitation 430, including the sender of the invitation 430 and the time and place of the meeting, but it can also include additional functionality. For example, the meeting card 420 can include buttons 421, 422, 423 for responding to the meeting invitation 430. The "accept" button 421 accepts the meeting invitation 430 and can add the meeting to the user's calendar and optionally send a response to the sender of the meeting invitation 430 indicating that the user will attend the meeting. The "maybe" button 422 can also add the meeting to the user's calendar and optionally send a response to the sender of the meeting invitation 430 indicating that the user might attend the meeting. The "decline" button 423 can remove the meeting from the user's calendar and optionally send a response to the sender of the meeting invitation 430 indicating that the user will not attend the meeting.

The meeting card 420 can include meeting details 424 that provide various details about the meeting. For example, the meeting details 424 can include the time of the meeting, organizer of the meeting, attendees, and other relevant information. The meeting card 420 can also include one or more actionable items 425 imbedded in the meeting card 420. The actionable items 425 displayed in the meeting card 420 can be selected in a number of ways. In one example, the email application searches the meeting-invitation body 432 itself to determine whether any actionable items 425 are present. For example, the meeting-invitation body 432 can include an instruction that "everyone please bring your laptops with you to this meeting." The email application can parse the meeting, invitation 430 in the same manner as it would an email: extracting sentences, converting them to number sentences, providing the number sentences to the model, and determining whether the number sentences represent an actionable item. If so, the email application can utilize that actionable item 425 by inserting it into a meeting card 420.

Although an actionable item 425 can be found in the body 432 of a meeting invitation, actionable items 425 can also be obtained in other manners. For example, the email application can search for actionable items relating to the sender of the meeting invitation 430. Taking the example of FIG. 4, the sender, Adam Rykowski, may have sent an email to the user that included an actionable item 425, such as the one shown: "If you could take a look at that report that would be great. We need to speak to Neil about the latest release." The application can include any unresolved actionable items 425 from the sender of the meeting invitation 430, providing a reminder to the user of potential issues or talking points that may arise. In an example, the actionable items 425 are only displayed to the user that originally received the actionable items 425—rather than displaying them widely to all participants of the meeting. On the other hand, if an actionable item 425 was sent to multiple users and those same users are included in the meeting invitation 430, then each of those users can receive the actionable item 425 on a meeting card 420 on their respective GUIs 400.

In the examples described above, actionable items are displayed within an email, in a hero card associated with an email, or in a meeting invitation. However, actionable items are not limited to being displayed in these locations. Actionable items can be incorporated into other portions of an email application or even an overall operating system. As an example, actionable items can be obtained from a calendar reminder and inserted into an Actionable Item view 210 such as the one shown in FIGS. 2A, 2B, and 5. Furthermore, actionable items can be obtained from voice messages that are transcribed by an operating system on the user device. If the user device includes a contact for that voice message, an actionable item can be created and attributed to that contact.

Actionable items can also be displayed in a "task list" format, with an entry for each actionable item. The task list can be displayed separately from the Actionable Items list 210 or any of the other views discussed above. The task list can be sorted based on the sender, the date received, or based on an order manually arranged by the user. The task list can also include checkboxes or any other applicable GUI element allowing the user to indicate when a particular actionable item has been completed or is otherwise ready to be removed from the task list. The task list can be displayed in a hero card, in an example.

Figure 5:
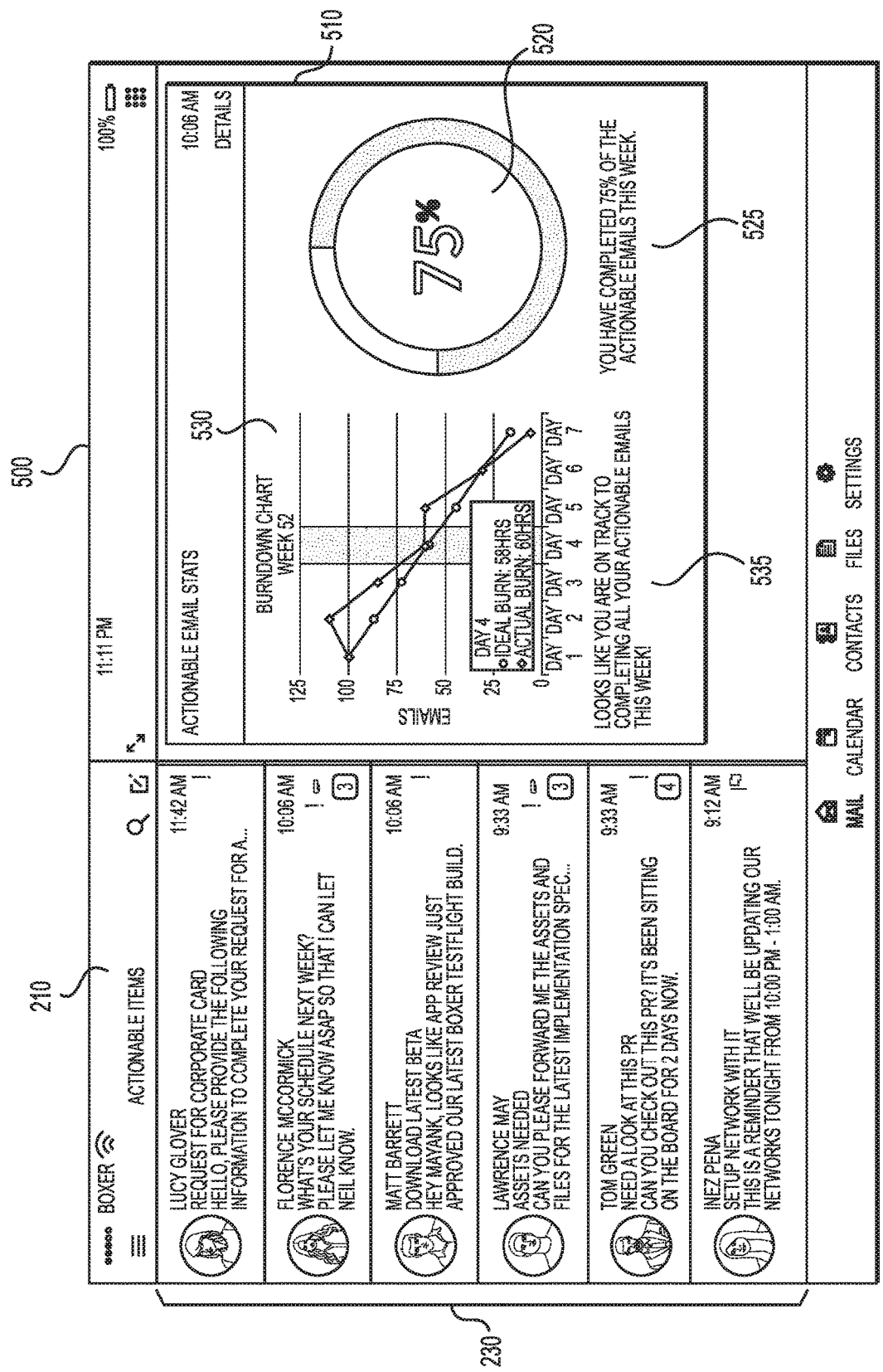
FIG. 5 is an exemplary illustration of an example GUI of an email application on a user device.

FIG. 5 shows another GUI 500 that can be displayed on a user device. The GUI 500 includes an Actionable Items view 210, as shown in FIGS. 2A and 2B, along with a statistics card 510. The statistics card 510 can be a type of hero card, in an example. The statistics card 510 provides a variety of statistics and analytics relating to actionable items relating to the user. For example, the statistics card 510 can display a progress icon 520 that displays a measure of progress the user has made in completing actionable items. The progress icon 520 can include a numerical measure, such as a percentage, or a visual measure, such as a circular bar that is filled according to a percentage, or both. The progress icon 520 of FIG. 5 reads "75%" and also includes a circular bar of which 75% is filled-in. The percentage displayed by the progress icon 520 can be based on actionable items completed in a period of time versus the overall number of actionable items received in that same period of time. In another example, the percentage displayed by the progress icon 520 can be based on actionable emails completed in a period of time versus the overall number of actionable emails completed in a that same period of time. The time period can be selected automatically or can be manually selected by the user via a settings page.

The progress icon 520 can be accompanied by a progress icon explanation 525. In the example of FIG. 5, the progress icon explanation 525 explains that "you have completed 75% of the actionable emails this week." From this explanation 525, the user can understand that the relevant time period is one week, and that the progress icon 520 is calculating actionable emails rather than actionable items (as some actionable emails can include multiple actionable items).

The statistics card 510 of FIG. 5 also includes a burndown chart 530 showing graphical representations of a suggested pace for resolving actionable items (or actionable emails) alongside the user's actual pace in resolving those actionable items or emails. The burndown chart 530 can be used for "sprint" events, where a user designates a time period by which to complete a group of actionable items or emails. In some examples, the time period can be designated automatically, such as by defaulting to a seven-day period. The burndown chart 530 can be accompanied by a chart explanation 535 that provides further insight to the user. In the example of FIG. 5, the chart explanation 535 states "looks like you are on track to completing all your actionable emails this week!" The chart explanation 535 can warn the user when they are falling behind, providing motivation for the user to increase the pace at which they are resolving actionable items. The charts and analytics displayed in the statistics card 510 are merely exemplary; other displays of statistics or analytics can be included in the statistics card 510 as appropriate. In some examples, the user can customize the types of statistics or analytics displayed.

Figure 6:
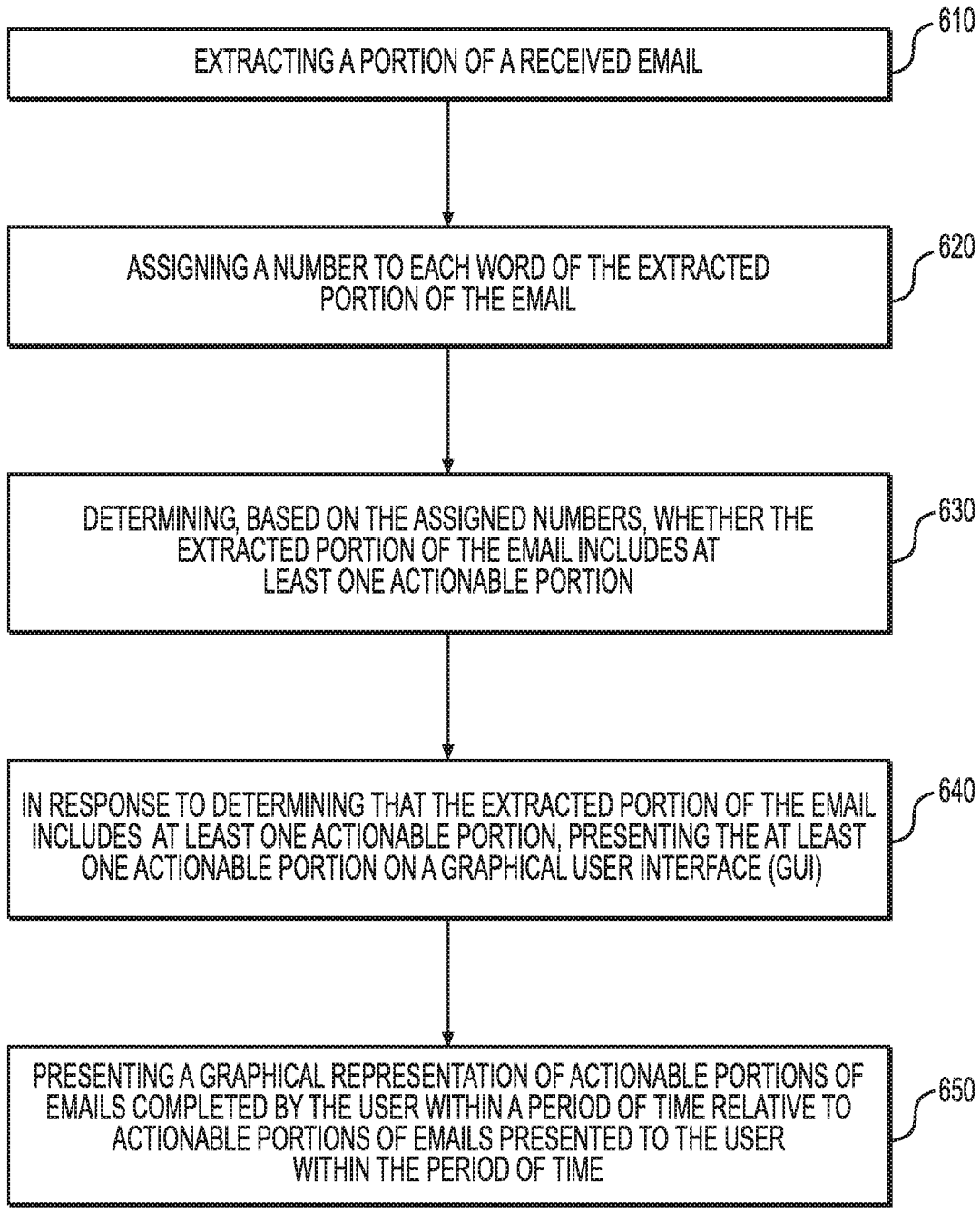
FIG. 6 is an exemplary flowchart of an example method for identifying actionable tasks in a received email.

FIG. 6 is an exemplary flowchart of an example method for identifying actionable tasks in a received email. Stage 610 of the method can include extracting a portion of a received email. This can include, for example, extracting an email body of the email, which can include identifying the body of the email, extracting all elements within the body, and copying those elements over to another location. The stage can also include extracting individual sentences, clauses, phrases, or terms from the extracted email body. This can include removing or ignoring images, greeting, signatures, and legal notices.

Stage 620 can include assigning a number to each word of the extracted portion of the email. The assignment can be done according to an index stored on the user device. The index can be a table saved on the user device, for example, and can provide a unique numerical value for every word or root word. When a word is not included in the index, it can be automatically added to the index and assigned a new, unique numerical value. When the words of a sentence, clause, phrase, or term have been replaced by the corresponding numbers from the index, the resulting "number sentences" can be used for further analysis.

For example, stage 630 of the method can include determining, based on the assigned numbers, whether the extracted portion of the email includes at least one actionable portion. This determination can be made by a model stored on the user device. The model can be the result of a machine-learning process carried out by the user device or another computing device with greater computing power.

The model can be trained with an example corpus of emails in which the actionable items within those emails are flagged. Various machine-learning techniques can be used, such as RFC, LSTM, and CNN, as discussed above with respect to FIG. 1. The model can be improved over time as more emails are processed and more feedback is received from users. As the model is improved, new versions can be sent to the user device to be implemented moving forward.

At stage 640, in response to determining that the extracted portion of the email includes at least one actionable portion, the at least one actionable portion can be presented on a GUI of the user's device. Presenting the actionable portion can take a variety of forms, some of which are depicted in FIGS. 2A, 2B, 3, 4, and 5. For example, the GUI can display an Actionable Items view that lists the emails containing actionable items. The GUI can display a task list showing actionable items (rather than entire emails) The GUI can also highlight the actionable items within the email itself, as shown in FIG. 2B. It can also display a hero card that presents the actionable item in conjunction with the email, as shown in FIG. 3. The GUI can also display the actionable item as part of a meeting card, as shown in FIG. 4.

Stage 650 can include presenting a graphical representation of actionable portions of emails completed by the user within a period of time relative to actionable portions of emails presented to the user within the period of time. This can include, for example, displaying a statistics card as shown in FIG. 5. The statistics card can include a progress icon that displays a measure of progress the user has made in completing actionable items. It can also include a graphical display, such as a burndown chart, showing graphical representations of a suggested pace for resolving actionable items or emails alongside the user's actual pace in resolving those actionable items or mails. The statistics card can also include explanations that provide the user with context and additional details regarding the statistics.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for presenting actionable items from a received email, comprising:
    extracting a portion of the received email and processing the portion with a trained model;
    determining that the portion includes at least one new actionable item;
    presenting, in a first view of a graphical user interface ("GUI"), the received email in a list view that includes and displays only emails with one or more actionable items;
    presenting, in a second view of the GUI, a body of the received email in an email view based on a selection of the received email from the list view; and
    visually distinguishing the at least one new actionable item within the email view relative to other portions of the received email.

2. The method of claim 1,
    wherein action types of new actionable items include sending an email response, placing a phone call, confirming receipt of an item, providing a document, performing a task, and responding to a meeting invitation,
    wherein presenting the received email in the list view includes presenting a first received email and a second received email, and
    wherein the first received email includes a first actionable item of an action type different from that of a second actionable item of the second received email.

3. The method of claim 1, wherein the at least one new actionable item includes multiple actionable items, and wherein presenting the received email in the list view includes displaying a graphical element that indicates the received email includes multiple actionable items.

4. The method of claim 1, wherein presenting the body in the second view of the GUI includes presenting a selectable option along with the body in the email view, and wherein visually distinguishing the at least one new actionable item in the email view includes highlighting the at least one new actionable item based on a selection of the selectable option.

5. The method of claim 1, further comprising, presenting, with respect to actionable items of received emails presented to a user over a period of time, a graphical representation of completed actionable items relative to total actionable items in the second view of the GUI.

6. The method of claim 1, wherein visually distinguishing includes highlighting the at least one new actionable item relative to the other portions by at least one of obscuring the other portions and presenting the at least one new actionable item in a format different from a format of the other portions.

7. The method of claim 1, further comprising:
    presenting a feedback element in the GUI;
    generating feedback data indicating an accuracy of the determining based on a selection of at least one selectable element associated with the feedback element; and
    utilizing the feedback data to refine the trained model for identifying actionable items.

8. A non-transitory, computer-readable medium comprising instructions that, when executed by a processor, perform stages for presenting actionable items from a received email, the stages comprising:
    extracting a portion of the received email and processing the portion with a trained model;
    determining that the portion includes at least one new actionable item;
    presenting, in a first view of a graphical user interface ("GUI"), the received email in a list view that includes and displays only emails with one or more actionable items;
    presenting, in a second view of the GUI, a body of the received email in an email view based on a selection of the received email from the list view; and
    visually distinguishing the at least one new actionable item within the email view relative to other portions of the received email.

9. The non-transitory, computer-readable medium of claim 8,
    wherein action types of new actionable items include sending an email response, placing a phone call, confirming receipt of an item, providing a document, performing a task, and responding to a meeting invitation, wherein presenting the received email in the list view includes presenting a first received email and a second received email, and wherein the first received email includes a first actionable item of an action type different from that of a second actionable item of the second received email.

10. The non-transitory, computer-readable medium of claim 8, wherein the at least one new actionable item includes multiple actionable items, and wherein presenting the received email in the list view includes displaying a graphical element that indicates the received email includes multiple actionable items.

11. The non-transitory, computer-readable medium of claim 8, wherein presenting the body in the second view of the GUI includes presenting a selectable option along with the body in the email view, and wherein visually distinguishing the at least one new actionable item in the email view includes highlighting the at least one new actionable item based on a selection of the selectable option.

12. The non-transitory, computer-readable medium of claim 8, the stages further comprising, presenting, with respect to actionable items of received emails presented to a user over a period of time, a graphical representation of completed actionable items relative to total actionable items in the second view of the GUI.

13. The non-transitory, computer-readable medium of claim 8, wherein visually distinguishing includes highlighting the at least one new actionable item relative to the other portions by at least one of obscuring the other portions and presenting the at least one new actionable item in a format different from a format of the other portions.

14. The non-transitory, computer-readable medium of claim 8, the stages further comprising:
presenting a feedback element in the GUI;
generating feedback data indicating an accuracy of the determining based on a selection of at least one selectable element associated with the feedback element; and
utilizing the feedback data to refine the trained model for identifying actionable items.

15. A system, for presenting actionable items from a received email, comprising:
a memory storage including a non-transitory, computer-readable medium comprising instructions; and
a user device including a processor that executes the instructions to carry out stages comprising:
extracting a portion of the received email and processing the portion with a trained model;
determining that the portion includes at least one new actionable item;
presenting, in a first view of a graphical user interface ("GUI"), the received email in a list view that includes and displays only emails with one or more actionable items;
presenting, in a second view of the GUI, a body of the received email in an email view based on a selection of the received email from the list view; and
visually distinguishing the at least one new actionable item within the email view relative to other portions of the received email.

16. The system of claim 15,
wherein action types of new actionable items include sending an email response, placing a phone call, confirming receipt of an item, providing a document, performing a task, and responding to a meeting invitation,
wherein presenting the received email in the list view includes presenting a first received email and a second received email, and
wherein the first received email includes a first actionable item of an action type different from that of a second actionable item of the second received email.

17. The system of claim 15, wherein the at least one new actionable item includes multiple actionable items, and wherein presenting the received email in the list view includes displaying a graphical element that indicates the received email includes multiple actionable items.

18. The system of claim 15, the stages further comprising, presenting, with respect to actionable items of received emails presented to a user over a period of time, a graphical representation of completed actionable items relative to total actionable items in the second view of the GUI.

19. The system of claim 15, wherein visually distinguishing includes highlighting the at least one new actionable item relative to the other portions by at least one of obscuring the other portions and presenting the at least one new actionable item in a format different from a format of the other portions.

20. The system of claim 15, the stages further comprising:
presenting a feedback element in the GUI;
generating feedback data indicating an accuracy of the determining based on a selection of at least one selectable element associated with the feedback element; and
utilizing the feedback data to refine the trained model for identifying actionable items.

\* \* \* \* \*